US008917206B2

(12) United States Patent
Edge et al.

(10) Patent No.: US 8,917,206 B2
(45) Date of Patent: Dec. 23, 2014

(54) MOBILE-BASED POSITIONING WITH NON-CONFORMING USE OF ASSISTANCE DATA

(75) Inventors: Stephen W. Edge, Escondido, CA (US); Parag Arun Agashe, San Diego, CA (US); Sven Fischer, Nuremberg (DE); Marc A. Ische, San Diego, CA (US); Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 467 days.

(21) Appl. No.: 12/796,238

(22) Filed: Jun. 8, 2010

(65) Prior Publication Data

US 2010/0309057 A1 Dec. 9, 2010

Related U.S. Application Data (60) Provisional application No. 61/185,516, filed on Jun. 9, 2009.

(51) Int. Cl.
| | | |
|---|---|---|
| *G01S 19/25* | (2010.01) | |
| *G01S 3/02* | (2006.01) | |
| *G01S 5/02* | (2010.01) | |
| *H04W 64/00* | (2009.01) | |

(52) U.S. Cl.
CPC ............ *H04W 64/00* (2013.01); *G01S 5/0236* (2013.01); *G01S 5/0257* (2013.01)
USPC ...................................... 342/357.64; 342/463

(58) Field of Classification Search
USPC ............ 342/357.4, 357.42, 357.64, 451, 463; 455/456.1, 456.6; 701/451
See application file for complete search history.

(56) References Cited

U.S. PATENT DOCUMENTS

| | | |
|---|---|---|
| 2004/0073365 A1 | 4/2004 | Alanen et al. |
| 2004/0142702 A1 | 7/2004 | Hefner et al. |

(Continued)

FOREIGN PATENT DOCUMENTS

| | | |
|---|---|---|
| CN | 1518391 A | 8/2004 |
| CN | 1538190 A | 10/2004 |

(Continued)

OTHER PUBLICATIONS

3GPP: "3rd Generation Partnership Project;Technical Specification Group Radio Access Network; Evolved Universal Terrestrial Radio Access (E-UTRA); Stage 2 functional specification of User Equipment (UE) positioning in E-UTRAN (Release 9)" 3GPP Draft; 36.305-V1.0.0, 3rd Generation Partnership Project (3GPP), Mobile Competence Centre ; 650, Route des Lucioles ; F-06921 Sophia-Antipolis Cedex ; France, May 1, 2009, XP050389460 [retrieved on Sep. 8, 2009] chapters 4.2, 4.3, 5.3.1, 8.1.1, 8.1.2.2.2, 8.2.1,8.1.3.2.

(Continued)

*Primary Examiner* — Dao Phan (57) ABSTRACT

Apparatus and methods for performing mobile-based positioning in a wireless communications system are presented. A position estimate is computed based on assistance data intended for a first position method. The mobile device ignores if a second positioning method is not specifically supported by a network and computes a position estimate using the second position method and a subset of assistance data intended for the first positioning method, which is supported by the network and is different from the second positioning method.

22 Claims, 7 Drawing Sheets

(56) References Cited

U.S. PATENT DOCUMENTS

| | | |
|---|---|---|
| 2006/0194591 A1 | 8/2006 | Xiong et al. |
| 2007/0046532 A1 | 3/2007 | Bucknor et al. |
| 2007/0109184 A1 | 5/2007 | Shyr et al. |
| 2009/0181698 A1 | 7/2009 | Farmer et al. |
| 2009/0253440 A1 | 10/2009 | Edge |
| 2010/0013701 A1 | 1/2010 | Fischer et al. |
| 2010/0171660 A1 | 7/2010 | Shyr et al. |

FOREIGN PATENT DOCUMENTS

| | | |
|---|---|---|
| CN | 1909717 A | 2/2007 |
| CN | 1976531 A | 6/2007 |
| JP | 2005086629 A | 3/2005 |
| WO | 2008064745 A1 | 6/2008 |

OTHER PUBLICATIONS

3rd Generation Partnership Project; Technical Specification Group Radio Access Network; Stage 2 functional specification of User Equipment (UE) positioning in UTRAN (Release 8) 3GPP Standard; 3GPP TS 25.305, 3rd Generation Partnership Project (3GPP), Mobile Competence Centre ; 650, Route des Lucioles ; F-06921 Sophia-Antipolis Cedex ; France, No. V8.1.0, Dec. 1, 2008 , pp. 1-79, XP050367438 chapters 4.2, 4.3-4.3.4, 5.2.4, 6.6.4.1.1-6.6.4.1.4, 8-8.2, 9-9.5, 10.3.

Borkowski J M: "Performance of Cell ID+RTT Hybrid Positioning Method for UMTS" Master of Science Thesis—Tampere University of Technology—Department of Information Technology Dec. 10, 2003, pp. 1-96, XP002601501 Retrieved from the Internet:URL:http://www.cs.tut.fi/tlt/RNG/publications/docs/location/MScJakub.pdf [retrieved on Sep. 20, 2010] chapters 3.2-3.2.2, 3.2.3.3, 3.3.1-3.3.3.1, 3.4, 3.4.2.

International Search Report and Written Opinion—PCT/US2010/038017, International Search Authority—European Patent Office—Oct. 1, 2010.

| Mobile-based terrestrial positioning methods supported ||| 
|---|---|---|
| Method | Mobile device | Network (standardized methods) |
| First | Not supported | A-FLT |
| Second | Not supported | OTDOA |
| Third | Not supported | E-OTD |
| Fourth | E-CID | Not supported |

MOBILE-BASED POSITIONING WITH NON-CONFORMING USE OF ASSISTANCE DATA

RELATED APPLICATIONS

This application claims the benefit of and priority to U.S. Provisional Application No. 61/185,516 filed Jun. 9, 2009, titled "UE-based positioning with proprietary assistance data," assigned to the assignee hereof, and which is expressly incorporated herein by reference.

FIELD

This disclosure relates generally to apparatus and methods for estimating a position of a wireless mobile device. More particularly, the disclosure relates to a mobile device using a position estimation method, which may not be supported by a network, where the network supplies assistance data intended for a different position estimation method.

BACKGROUND

Today, a mobile device must comply with recognized mobile radio standards and protocols in its communications with a network. When a mobile device computes a position estimate, it first determines what mobile-based position methods are supported by the network. For example, a mobile device may monitor overhead information broadcast by the network. Within this overhead information, the network may announce what positioning method or methods it supports. Alternatively, a mobile device may receive information on which position methods a network supports in a point to point manner from an entity within the network (e.g. a location server). Alternatively, a mobile device may request assistance data tailored for a particular positioning method. Assistance data tailored for a particular method shortens the assistance data by leaving out extraneous types of data not used by that positioning method. If the network and mobile device both support a common mobile-based positioning method using the requested assistance data, the mobile device may request and receive assistance data for that particular common positioning method. Once a mobile device receives the assistance data, the mobile devices uses it to compute a position estimate.

Different positioning methods require different sets of information. Therefore, each type of assistance data message includes a different set of information. That is, a network tailors an assistance data message to contain the required set of information for a particular positioning method. As a result, the network transmits just the information needed for a selected positioning method. The network does not transmit extraneous and unnecessary information not needed and not used by the mobile device for the selected positioning method.

If a mobile device wishes to perform an alternate positioning method, which uses a different set of assistance data, the mobile device may learn from the network that the alternate positioning method is not supported by the network. Alternatively, the mobile device may be aware that a position method is not supported by the network. For example, the position method may not be defined by a standard that the network follows (e.g., a wireless network implementing a standard from 3GPP, 3GPP2 or OMA). In this case, the mobile device will not invoke the alternate positioning method and instead either falls back to some common positioning method or perform no positioning. For example, the mobile device might not support a position estimate based on the first positioning method but supports only a second positioning method. If the network does not support the second positioning method, the mobile device and network will be incompatible and incapable of supporting any mobile-based positioning method.

In other cases, a mobile device is able to compute a position estimate based on the first positioning method but selects to compute a position estimate based on the second positioning method. The second positioning method may have some benefit over the first positioning method, such as being less computationally intensive or requiring less power, which extends battery life of the mobile device. Alternatively, the second positioning method may be proprietary to a particular vendor or non-conforming to an industry standard or protocol. Disadvantageously, if the network does not also support the second positioning method, the mobile device will not use the second positioning method.

SUMMARY OF THE DISCLOSURE

Disclosed is an apparatus and method for performing mobile-based positioning in a wireless communications system. According to some aspects, disclosed is a method and apparatus for ignoring if a (second) positioning method is not supported by a network and computing a position estimate based on subset of assistance data tailored for a different (first) positioning method.

According to some aspects, disclosed is a method for performing mobile-based positioning in a wireless communications system, the method comprising: receiving, with a wireless receiver in a mobile device, assistance data for a first positioning method from a network supporting the first positioning method; receiving wireless signals from a plurality of transmitters; and computing a position estimate with a second positioning method using the wireless signals and the assistance data for the first positioning method; wherein the first positioning method and the second positioning method are different positioning methods.

According to some aspects, disclosed is a mobile device for performing mobile-based positioning in a wireless communications system, the device comprising: a receiver assembly comprising at least one wireless receiver to receive assistance data for a first positioning method from a network supporting the first positioning method; and to receive wireless signals from a plurality of transmitters; and a processor, coupled to the receiver assembly, configured to compute a position estimate with a second positioning method using the wireless signal and the assistance data for the first positioning method; wherein the first positioning method and the second positioning method are different positioning methods.

According to some aspects, disclosed is a mobile device for performing mobile-based positioning in a wireless communications system, the device comprising: means for receiving, with a wireless receiver in the mobile device, assistance data for a first positioning method from a network supporting the first positioning method; means for receiving wireless signals from a plurality of transmitters; and means for computing a position estimate with a second positioning method using the wireless signal and the assistance data for the first positioning method; wherein the first positioning method and the second positioning method are different positioning methods.

According to some aspects, disclosed is a mobile device for performing mobile-based positioning in a wireless communications system, the device comprising a processor and memory wherein the memory includes software instructions to: receive, with a wireless receiver in the mobile device, assistance data for a first positioning method from a network supporting the first positioning method; receive wireless signals from a plurality of transmitters; and compute a position estimate with a second positioning method using the wireless signal and the assistance data for the first positioning method; wherein the first positioning method and the second positioning method are different positioning methods.

According to some aspects, disclosed is a computer-readable medium comprising program code stored thereon for a mobile device for performing mobile-based positioning in a wireless communications system, the program code including program code to: receive, with a wireless receiver in the mobile device, assistance data for a first positioning method from a network supporting the first positioning method; receive wireless signals from a plurality of transmitters; and compute a position estimate with a second positioning method using the wireless signal and the assistance data for the first positioning method; wherein the first positioning method and the second positioning method are different positioning methods.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Mobile devices and networks support a range of positioning methods, algorithms and techniques. Some positioning methods are executed entirely within the network requiring no special action from the mobile device. Other positioning methods are performed entirely by a mobile device without communication with the network. Still other positioning methods require the assistance of the mobile device to help a network determine a position estimate of the mobile device. Yet other positioning methods require the assistance of the network to help a mobile device determine a position estimate. As well, positioning methods may be terrestrial based, satellite based or a combination.

In accordance with the present invention, considered are a class of network-assisted positioning methods that are terrestrial based or terrestrial based combined with a satellite positioning method. A network assists a mobile device by providing assistance data used in a first positioning method. From the perspective of the network, the network is assisting the mobile device in performing the first positioning method to estimate a position. The mobile device receives this assistance data, however, does not perform the intended first positioning method. Instead, the mobile device performs a second positioning method. In some instances, the mobile device uses a subset of the assistance data and discards the remaining assistance data. In this manner, a mobile device may perform a non-standard, unsupported and/or proprietary positioning method, which may not be directly supported by the network.

Examples of terrestrial, network-assisted positioning methods include: E-OTD (Enhanced Observed Time Difference); A-FLT (Advanced Forward Link Trilateration); OTDOA (Observed Time Difference of Arrival); E-CID (Enhanced Cell Identity); CID (Cell Identity); and A-GPS (Assisted Global Positioning System). The term "GPS" is used generically to refer to any satellite positioning system (sometimes also referred to as GNSS (Global Navigation Satellite System)). A-FLT, E-OTD, and OTDOA are positioning methods based on timing measurements to base stations in the network. Each method requires a tailored set of assistance data. For example, E-OTD assistance data includes base station coordinate information. E-OTD, OTDOA, E-CID and A-GPS are position methods defined by the Third Generation Partnership Project (3GPP). A-FLT and A-GPS are position methods defined by the Third Generation Partnership Project 2 (3GPP2). Other organizations, such as the IEEE, have defined other terrestrial timing based position methods similar to E-OTD, OTDOA and A-FLT.

Figure 1:
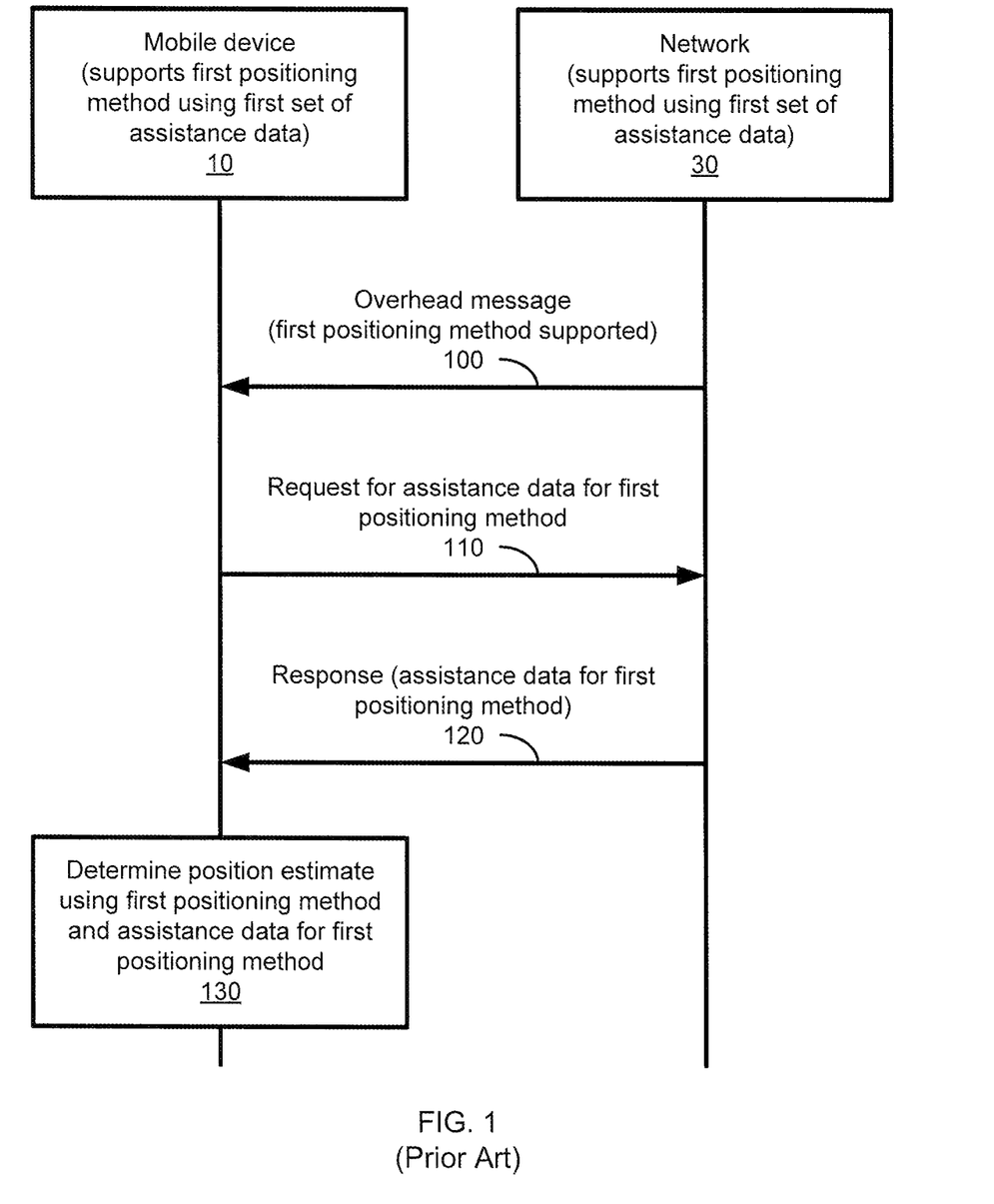
FIG. 1 shows a known message flow using a first positioning method supported by both a mobile device and a network.

FIG. 1 shows a known message flow using a first positioning method supported by both a known first mobile device 10 and a network 30. The first mobile device 10 supports the first positioning method using a first set of assistance data, which in this case is a network-assisted mobile-based method. The first positioning method may be the only positioning method supported by the first mobile device 10. Alternatively, the first mobile device 10 may also support other terrestrial and/or GNSS assisted and non-assisted methods. In this example, the network 30 similarly supports the first positioning method and supplies a first set of assistance data to the first mobile device 10.

At 100, the network 30 broadcasts an overhead message indicating the network 30 is capable of supporting a particular set of positioning methods, including a first positioning method. For example, a Cell Broadcast Service (CBS) channel may be used. Alternatively, a first mobile device 10 may request capability information from the network 30, which could respond with a response message containing network supported positioning methods. Alternatively, a first mobile device 10 may assume that network 30 supports a first positioning method (e.g., because the method is expected to be widely deployed). The first positioning method may be the only positioning method supported by network 30. Alternatively, the network 30 may support additional network-assisted methods and/or non-mobile assisted methods.

At 110, the first mobile device 10 determines it lacks assistance data needed to determine a position estimate and sends a request for the assistance data applicable to the first positioning method. At 120, the network 30 responds with the requested assistance data for the first positioning method. At 130, the first mobile device 10 determines a position estimate using the first positioning method based on the assistance data just received, which is tailored for the first positioning method.

Figure 2:
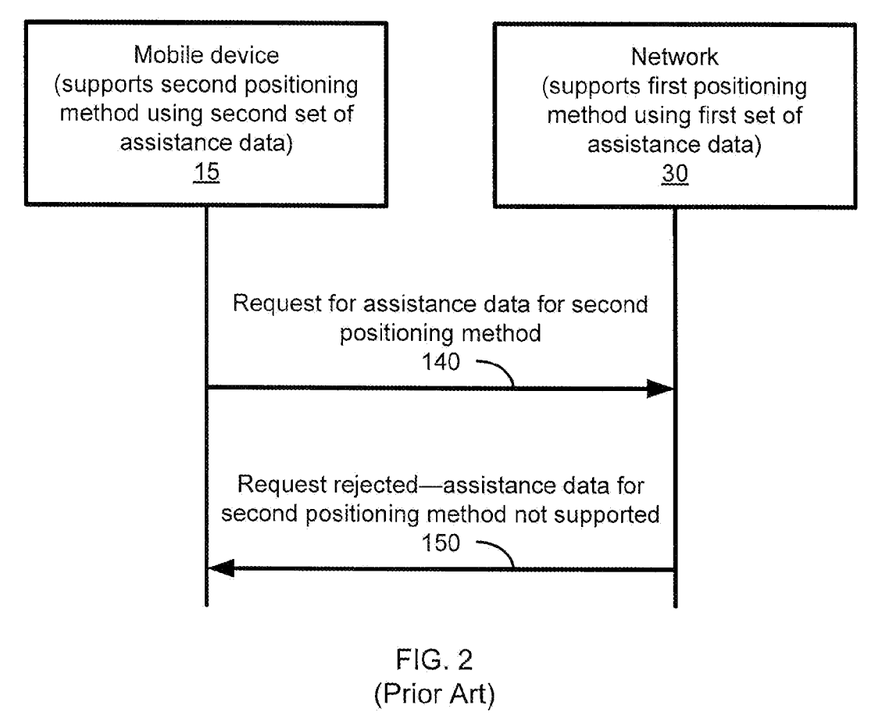
FIG. 2 shows a known message flow where a network supports a first positioning method but not a second positioning method supported by a mobile device.

FIG. 2 shows a known message flow where a network 30 supports a first positioning method but not a second positioning method supported by a mobile device. In this case, a known second mobile device 15 supports the second positioning method, which requires a second set of assistance data tailored to this second positioning method, but not the first positioning method supported by the network 30. At 140, the second mobile device 15 determines it will attempt to determine a position estimate using the second positioning method. The second mobile device 15 requests assistance data for the second positioning method. In response at 150, the network 30 responds indicating that the request was rejected because the network 30 does not support the second positioning method, which uses assistance data tailored to the second method.

Figure 3:
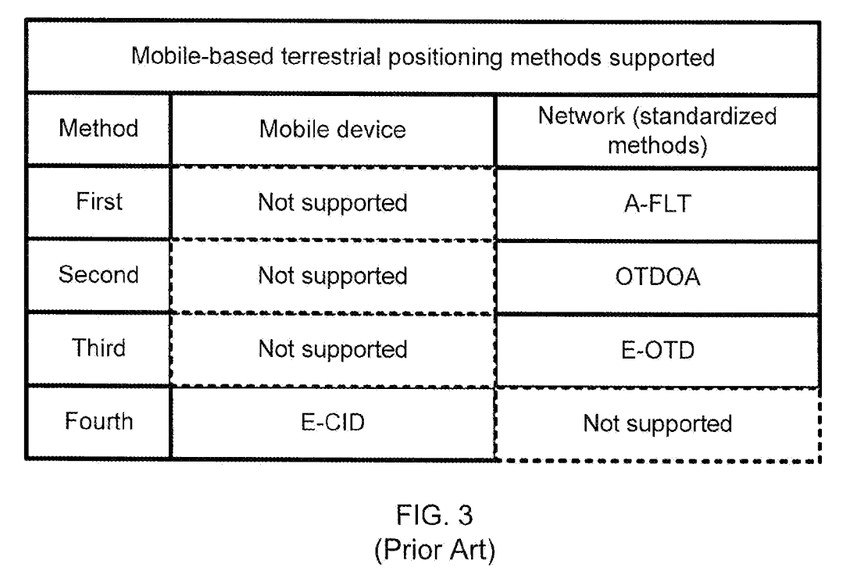
FIG. 3 illustrates various terrestrial positioning methods supported by a particular mobile device and/or a particular network.

FIG. 3 illustrates various terrestrial positioning methods supported by a particular mobile device and/or a particular network 30. This compatibility chart shows which mobile-based terrestrial positioning methods are supported by an exemplary mobile device (e.g., the first mobile device 10 or second mobile device 15) and which methods are supported by an exemplary network 30. In this example, a mobile device supports E-CID ($4^{th}$ method) but does not support A-FLT ($1^{st}$ method), OTDOA ($2^{nd}$ method) or E-OTD ($3^{rd}$ method). The network 30 supports A-FLT, OTDOA and E-OTD but not E-CID. Therefore, the combination of the network 30 and the mobile device supports none of the methods. In this case, the mobile device cannot request assistance data tailored to E-CID ($4^{th}$ method) and thus it does not perform the E-CID method to compute a position estimate.

Figure 4:
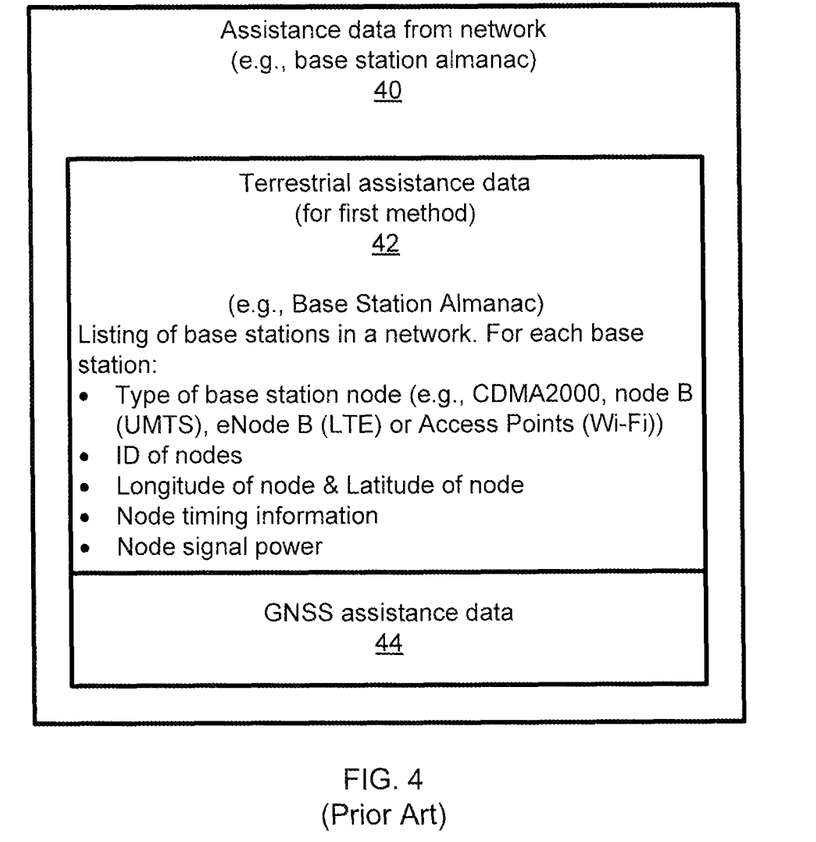
FIG. 4 illustrates an example assistance data message.

FIG. 4 illustrates an example assistance data message 40. The assistance data message 40 may be communicated in a broadcast fashion or via a point-to-point message. Here, the assistance data message 40 from a network 30 contains both terrestrial assistance data 42 (e.g., for a first method) and GNSS assistance data 44 for a satellite-based method. The assistance data message 40, terrestrial assistance data 42 and/or the GNSS assistance data 44 may be part of another message (such as a registration message) or in separate messages dedicated to communicating either terrestrial assistance data 42 or GNSS assistance data 44. As indicated above, the terrestrial assistance data 42 is tailored for a particular positioning method. In this example, the terrestrial assistance data 42 contains a base station almanac listing a set of base station in the network 30. The information for each base station includes the type of base station node (e.g., whether it is a CDMA2000, UMTS node B, LTE eNode B, GSM BTS or WiFi access point type base station). The information also includes an identification (ID) of the node as well as its longitude and latitude, transmission power and timing information. The timing information may provide the relationship between the transmission timing of the node and the timing of some other source such as absolute GPS time or the transmission timing of the node serving mobile device 20. The assistance data message 40 in this example also includes optional satellite or GNSS assistance data 44. In some embodiments, GNSS assistance data 44 is not be included. The terrestrial assistance data 42 may be tailored for a method that combines terrestrial and satellite position estimates or prefers one over the other.

Figure 5:
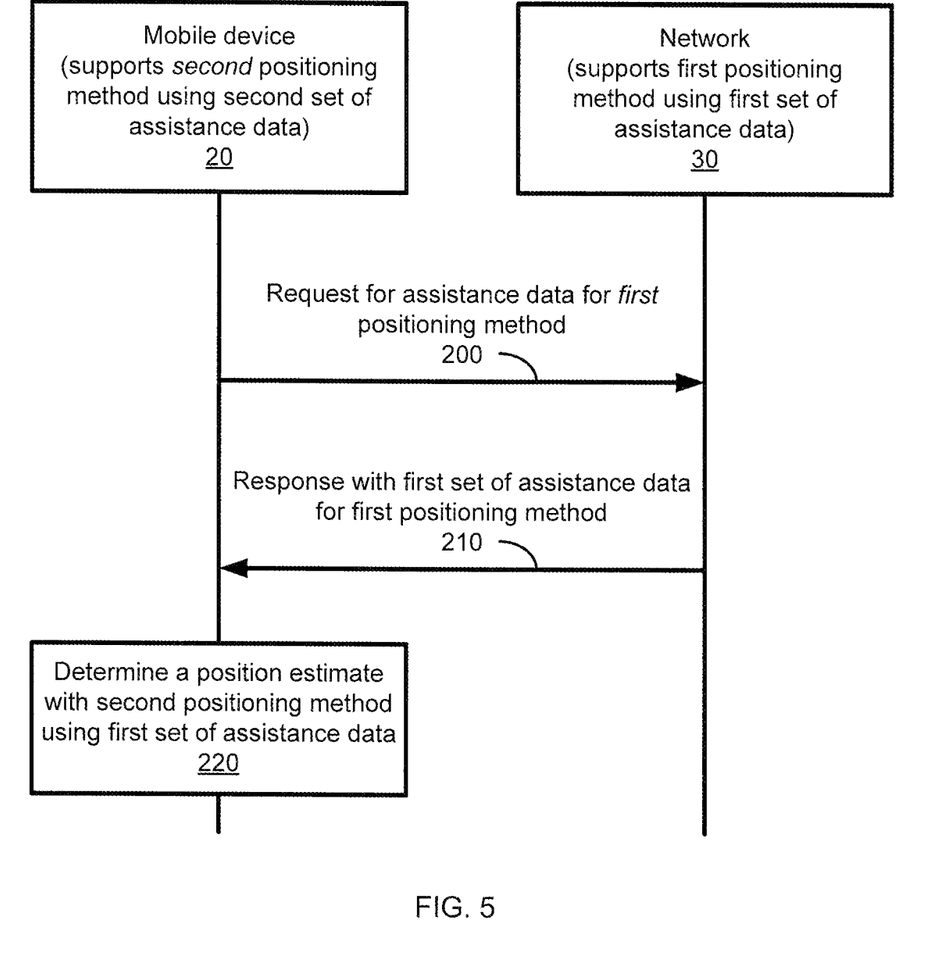
FIG. 5 shows a message flow where a network supports a first positioning method but not a second positioning method supported by a mobile device but the mobile device computes a position estimate based on the unsupported second positioning method, in accordance with some embodiments of the present invention.

FIG. 5 shows a message flow where a network 30 supports a first positioning method but not a second positioning method supported by a mobile device but the mobile device computes a position estimate based on the unsupported second positioning method, in accordance with some embodiments of the present invention. Such embodiments use a mobile device 20 that uses terrestrial assistance data 42 in a manner not in accordance with the network's intended use. Here, for example, a network 30 supports a first positioning method using a first set of terrestrial assistance data 42 but does not support a second positioning method. A mobile device 20, on the other hand, supports the second positioning method.

At 200, the mobile device 20 requests assistance data for the network-supported first positioning method. Alternatively, the network 30 may provide the mobile device 20 with the terrestrial assistance data 42 for the first positioning method: (1) by way of an unsolicited broadcast message; (2) by attaching or appending it to a previous response; and/or (3) by attaching it to a command sent to the mobile device 20 (e.g. a command from the network 30 for the mobile device 20 to obtain and return its location estimate).

At 210, the network 30 responds with a first set of terrestrial assistance data 42 tailored for the first positioning method. At 220, the mobile device 20 uses a subset of the terrestrial assistance data 42 just received to determine a position estimate using a second positioning method. In effect, the mobile device 20 ignores limitations of the network 30 by adapting the terrestrial assistance data 42 intended for one positioning method for another. Unlike known mobile devices (such as the first mobile device 10 or second mobile device 15), which are restricted to network-supported positioning methods, mobile device 20 makes use of the terrestrial assistance data 42, intended for use by a first positioning method, for an alternate positioning method.

In accordance with the present invention, the first positioning method is supported by the network 30 and the second positioning method is supported by the mobile device 20. The mobile device 20 may, but not necessarily, support the first positioning method in addition to the second positioning method. The network 30, however, may not support the second positioning method, which the mobile device 20 will execute. For example, the first position method may include one of an OTDOA (observed time difference of arrival) positioning method and an E-CID (enhanced cell identification) positioning method. The second position method may include the other one of the OTDOA and E-CID positioning methods.

The mobile device 20 may select the second positioning method because it uses less processing and/or is less computationally complex than the first positioning method. The mobile device 20 may select the second positioning method because it uses less battery power than network-supported methods. Alternatively, the mobile device 20 may select the second positioning method because it uses only a subset of the terrestrial assistance data 42 available from the network 30. Alternatively, the mobile device 20 may select the second positioning method because it performs better in at least one way, for example, reduced time to first fix and/or increased accuracy. Alternatively, the mobile device 20 may select the second positioning method because it preferred by the user or supplier of the mobile device 20. Alternatively, the mobile device 20 may select the second positioning method because a non-standardized positioning method not supported by the network 30 and/or a standard implemented by the network 30.

In using the terrestrial assistance data 42 provided by the network 30 for the first positioning method, the mobile device 20 may use a subset of the assistance data to perform a second position method. For example, if the mobile device 20 and the network 30 support the position methods according to FIG. 3 and assistance data message 40 is provided by network 30 according to FIG. 4, the terrestrial assistance data 42 may be provided by the network for OTDOA but be used by the mobile device 20 for E-CID. In this case, the mobile device 20 may ignore any node timing information in the terrestrial assistance data 42 and make use only a subset of the information (e.g., latitude and longitude of each node and node transmission power). This subset of information may be sufficient for mobile device 20 to obtain a position estimate using E-CID (e.g., the mobile device 20 may measure received signal strength of nearby nodes and combine this measured signal strength with the provided transmission power and latitude and longitude of each node to obtain an estimate of its location). In performing E-CID, the mobile device 20 might not measure the relative timing of each node, which would otherwise be required had mobile device 20 been performing OTDOA positioning. Mobile device 20 may thereby perform a different position method than the method supported by network 30 but is still able to use the assistance data 40 provided by the network 30 to execute the non-supported method. Furthermore, in this example, if network 30 does not provide all of the terrestrial assistance data 42 shown in FIG. 4, mobile device 20 might still be able to use a subset of the information to obtain its location using a method different than that intended by network 30. For example, if assistance data 42 includes the type, ID, latitude, longitude and timing information for each node but not the signal power, mobile device 20 may use just the latitude and longitude for each node but not the timing information to obtain its location using a different variant of the E-CID positioning method. For example, mobile device 20 may obtain a location estimate based on a weighted average of the node locations provided in assistance data 42 with weights assigned according to the received signal strength of each node at mobile device 20.

Figure 6:
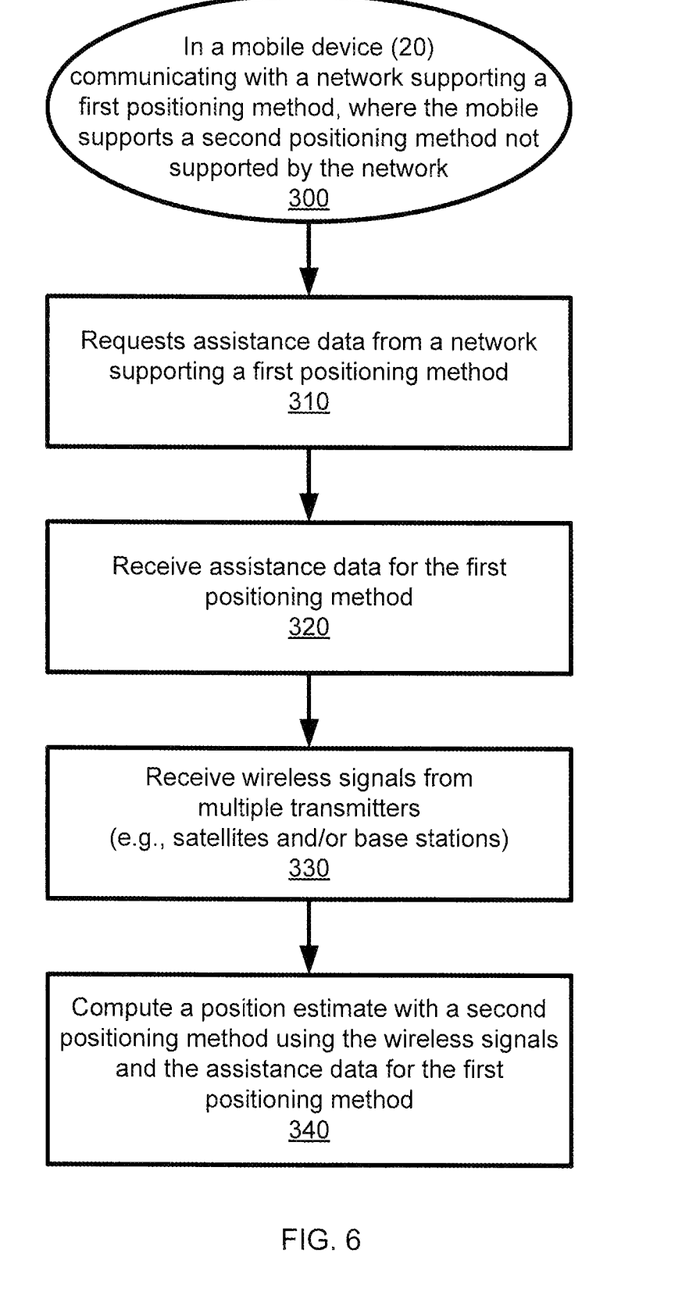
FIG. 6 shows a flow chart of the mobile device of FIG. 5.

FIG. 6 shows a flow chart of the mobile device 20 of FIG. 5. At 300, a mobile device 20 enters a network 30. The mobile device 20 communicates with the network 30 to determine what positioning methods are supported. In this example, the mobile device 20 determines the network 30 supports a first positioning method but not a second positioning method. In this case, the mobile device 20 intends to perform the second unsupported positioning method using network-provided terrestrial assistance data 42 associated with the first positioning method.

At 310, the mobile device 20 requests the terrestrial assistance data 42 from the network 30, allegedly in support for performing the first positioning method. At 320, the mobile device 20 receives a response from the network 30 containing the terrestrial assistance data 42 for the first positioning method.

At 330, the mobile device 20 tunes its receiver to receive wireless signals from one or more base stations or other terrestrial transmitters. The receiver analyzes the wireless signal to determine a characteristic of the base station signal. The characteristic depends on the specific positioning method employed. For example, the mobile device 20 may determine a relative time difference between base station signals or an absolute time for a signal to travel one way or round trip between each base station and the mobile device 20. The time difference may be used to determine a range for trilateration. The mobile device may also determine other characteristics of the base station signal, such as received signal strength or pathloss, or signal-to-interference characterics. Those characteristics may be used for determining range between mobile and transmitter or may be compared with location dependent expected signal characteristics using a data base of signal finger-prints of a particular area.

At 340, the mobile device 20 computes a position estimate using the second positioning method and characteristic determined based on the terrestrial assistance data 42 intended for the first positioning method. The mobile device 20 may also combine satellite positioning with terrestrial positioning. For example, an algorithm may weight a position estimate determined by a terrestrial positioning method and another position estimate determined by a satellite positioning method.

Figure 7:
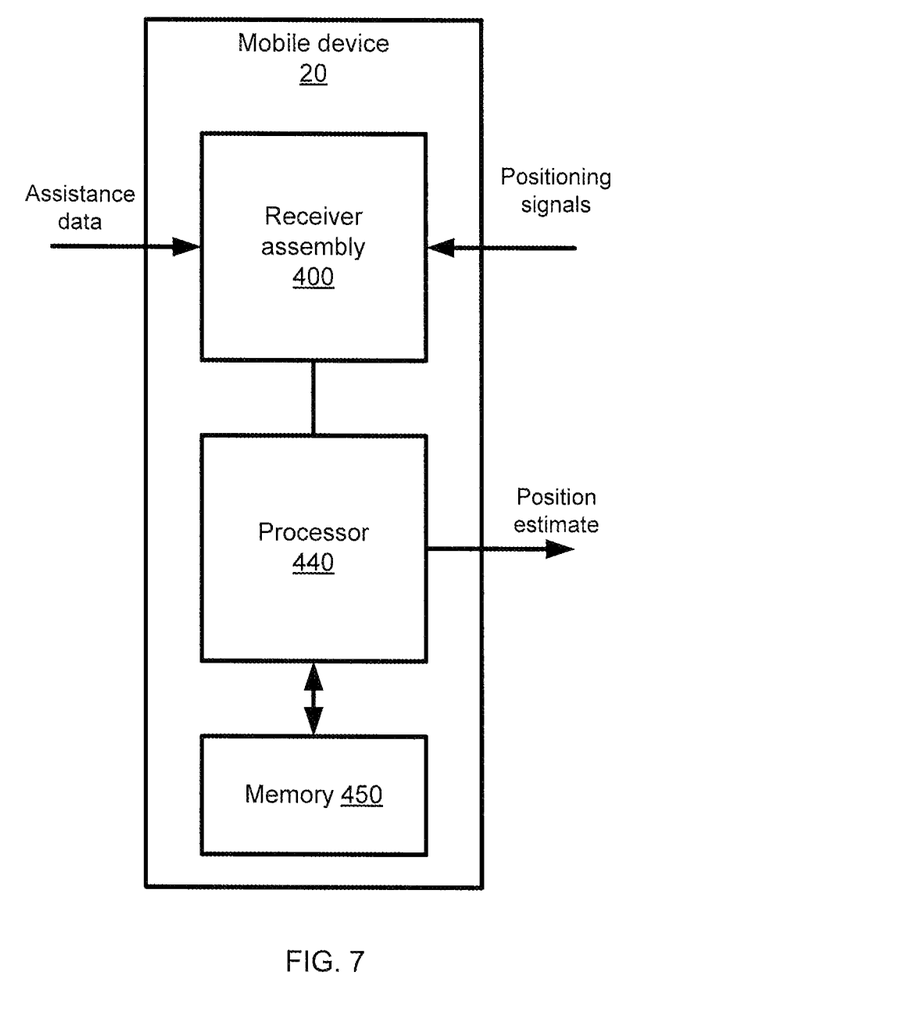
FIG. 7 illustrates a mobile device, in accordance with some embodiments of the present invention.

FIG. 7 illustrates a mobile device, in accordance with some embodiments of the present invention. The mobile device 20 performs mobile-based positioning in a wireless communications system and includes a receiver assembly 400 including at least one wireless receiver. The receiver assembly 400 acts as: (1) a means for receiving terrestrial assistance data 42 for a first positioning method from a network 30 supporting the first positioning method; and (2) a means for receiving wireless signals from a plurality of transmitters. The receiver assembly 400 both: (1) receives terrestrial assistance data 42 for a first positioning method from a network 30, which supports the first positioning method; and (2) receives wireless signals from one or more transmitters.

The mobile device 20 also includes a processor 440 coupled to the receiver assembly 400. The processor 440 acts as a means for computing a position estimate with a second positioning method using the wireless signal and the terrestrial assistance data 42 for the first positioning method. The processor 440 may be a special purpose microprocessor, a reduced instruction set computer (RISC) processor, an application specific integrated circuit (ASIC), a digital signal processor (DSP) or the like. The processor 440 is configured to compute a position estimate with a second positioning method using the wireless signal and the terrestrial assistance data 42 for the first positioning method, where the first and second positioning methods are different.

The mobile device 20 includes memory 450, which is separate from and/or integrated into the processor 440. The memory 450 may include software instructions in the form of executable code to: (1) receive, with a receiver assembly 400 in the mobile device, the terrestrial assistance data 42 for a first positioning method from a network 30 supporting the first positioning method; (2) receive wireless signals from a plurality of transmitters; and (3) compute a position estimate with a second positioning method using the wireless signals and the terrestrial assistance data 42 for the first positioning method. Similarly, this software may be written to a computer-readable medium, such as a RAM, EPROM, EEPROM, disc, hard drive, magnetic drive, optical drive, or the like.

Figure 8:
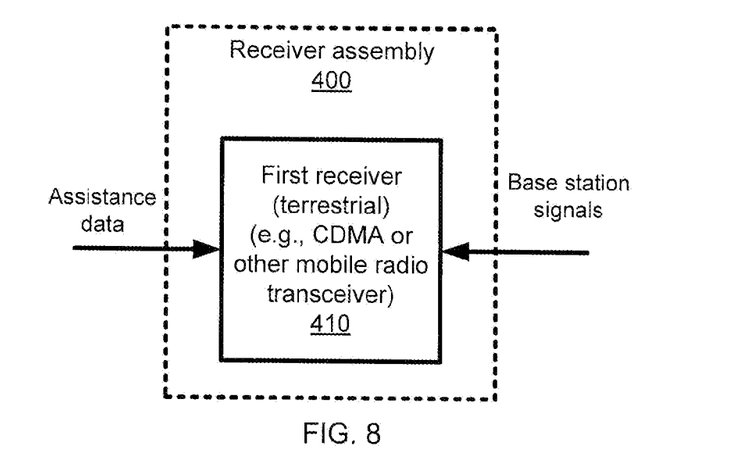
FIGS. 8 and 9 illustrate a receiver assembly, in accordance with some embodiments of the present invention.
Figure 9:
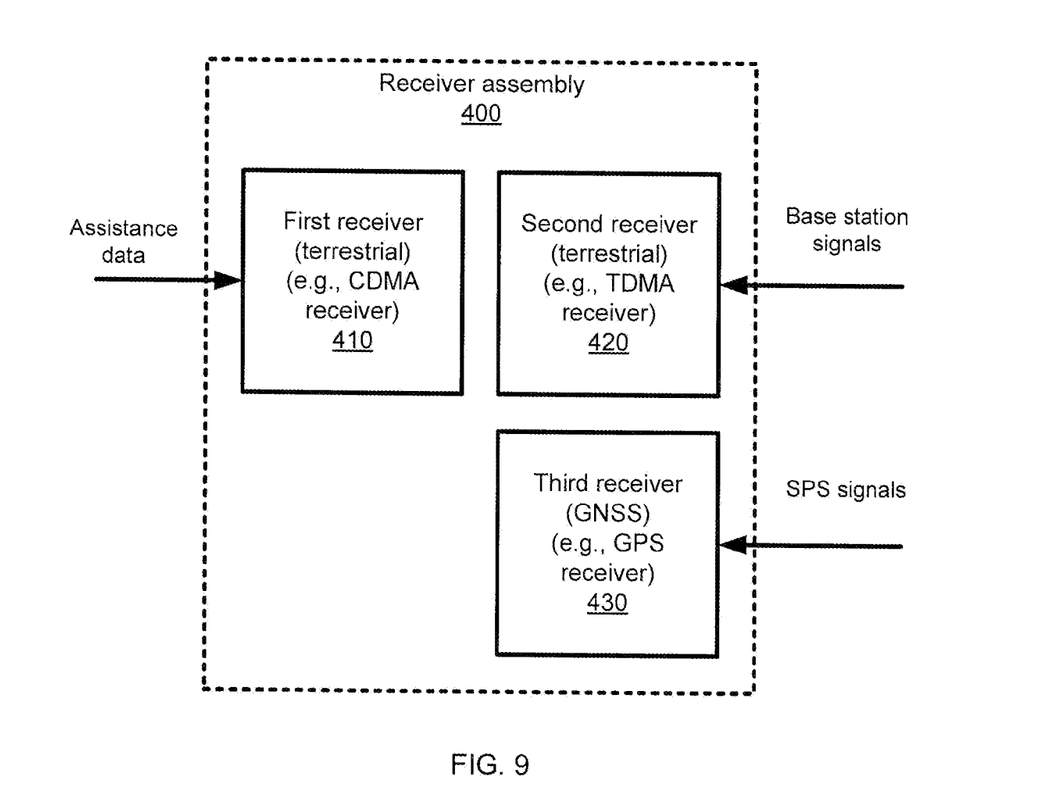

FIGS. 8 and 9 illustrate a receiver assembly 400, in accordance with some embodiments of the present invention. In FIG. 8, the receiver assembly 400 includes a first receiver 410, which is used to receive terrestrial signals including both assistance data message 40 from the network 30 and the wireless base station signal. In some cases, the wireless base station signal are from base station in the same network 30. In other cases, the wireless base station signals are from base stations outside the network 30. The first receiver 410 is configured to receive wireless signals based on a standard, such as a CDMA standard, a TDMA standard or other mobile radio standard.

FIG. 9 shows an alternate receiver assembly 400, which can include two or three receivers. A first receiver 410 is to receive terrestrial signals from the network 30 as described above. A second receiver 420 is also used to receive terrestrial signals from a network different from network 30. The different network may use a different standard than network 30. For example, network 30 may be a CDMA network and the different network may be a TDMA network.

A third receiver 430, which may be part of the receiver assembly 400 of either FIG. 8 or FIG. 9, is used to receive satellite positioning system (SPS) signals from satellites. The third receiver 430 may be a GPS receiver or similar GNSS receiver.

Each of the receivers described above is coupled to the processor 440 and may be implemented in hardware and/or software. The first receiver 410 and second receiver 420, described above, may be part of a transceiver. For example, the first receiver 410 may be part of receiver-transmitter pair found in a mobile radio transceiver.

As used herein, mobile device refers to a device such as a cellular or other wireless communication device, personal communication system (PCS) device; personal navigation device (PND), Personal Information Manager (PIM), Personal Digital Assistant (PDA), laptop or other suitable mobile device which is capable of receiving wireless communication and/or navigation signals. The term mobile device is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, mobile device is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile device."

The methodologies described herein may be implemented by various means depending upon the application. For example, these methodologies may be implemented in hardware, firmware, software, or any combination thereof. For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation. Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for performing mobile-based positioning in a wireless communications system, the method performed within a mobile device, comprising:
    receiving, with a wireless receiver in the mobile device, assistance data for a first positioning method from a network supporting the first positioning method;
    receiving wireless signals from a plurality of transmitters; and
    computing a position estimate with a second positioning method using the wireless signals and the assistance data for the first positioning method;
    wherein the first positioning method and the second positioning method are different positioning methods.

2. The method of claim 1, wherein the different positioning methods comprise one of an OTDOA (observed time difference of arrival) positioning method and an E-CID (enhanced cell identification) positioning method.

3. The method of claim 2, wherein the different positioning methods further comprise a different one of the OTDOA positioning method and enhanced cell ID positioning method.

4. The method of claim 1, further comprising requesting, by the mobile device, the assistance data.

5. The method of claim 1, wherein the assistance data comprise a location for each of a plurality of base stations.

6. The method of claim 1, wherein the mobile device does not support the first positioning method.

7. The method of claim 1, wherein the network does not support the second positioning method.

8. The method of claim 1, wherein the second positioning method uses only a subset of the assistance data.

9. The method of claim 1, wherein the second positioning method is non-standardized.

10. The method of claim 1, wherein the second positioning method is less computationally complex than the first positioning method.

11. A mobile device for performing mobile-based positioning in a wireless communications system, the device comprising:
    a receiver assembly comprising at least one wireless receiver:
        to receive assistance data for a first positioning method from a network supporting the first positioning method; and
        to receive wireless signals from a plurality of transmitters; and
    a processor, coupled to the receiver assembly, configured to compute a position estimate with a second positioning method using the wireless signal and the assistance data for the first positioning method;
    wherein the first positioning method and the second positioning method are different positioning methods.

12. The device of claim 11, wherein the receiver assembly comprises:
    a first receiver to receive the assistance data for the first positioning method from the network supporting the first positioning method; and
    a second receiver to receive the wireless signals from the plurality of transmitters.

13. The device of claim 12, wherein the first receiver comprises a mobile radio transceiver.

14. The device of claim 11, wherein the plurality of transmitters comprises signals from satellites.

15. The device of claim 11, wherein the plurality of transmitters comprises signals from base stations.

16. The device of claim 11, wherein the mobile device does not support the first positioning method.

17. The device of claim 11, wherein the network does not support the second positioning method.

18. The device of claim 11, wherein the second positioning method is non-standardized.

19. The device of claim 11, wherein the second positioning method is less computationally complex than the first positioning method.

20. A mobile device for performing mobile-based positioning in a wireless communications system, the device comprising:
    means for receiving, in the mobile device, assistance data for a first positioning method from a network supporting the first positioning method;
    means for receiving wireless signals from a plurality of transmitters; and
    means for computing a position estimate with a second positioning method using the wireless signal and the assistance data for the first positioning method;
    wherein the first positioning method and the second positioning method are different positioning methods.

21. A mobile device for performing mobile-based positioning in a wireless communications system, the device comprising a processor and memory wherein the memory includes software instructions to:
    receive, with a wireless receiver in the mobile device, assistance data for a first positioning method from a network supporting the first positioning method;
    receive wireless signals from a plurality of transmitters; and
    compute a position estimate with a second positioning method using the wireless signal and the assistance data for the first positioning method;

wherein the first positioning method and the second positioning method are different positioning methods.

22. A non-transitory computer-readable medium comprising program code stored thereon for a mobile device for performing mobile-based positioning in a wireless communications system, the program code including code to:
   receive, with a wireless receiver in the mobile device, assistance data for a first positioning method from a network supporting the first positioning method;
   receive wireless signals from a plurality of transmitters; and
   compute a position estimate with a second positioning method using the wireless signal and the assistance data for the first positioning method;
   wherein the first positioning method and the second positioning method are different positioning methods.

* * * * *